United States Patent [19]

Bodycomb

[11] 3,730,061

[45] May 1, 1973

[54] AIR BEARING ANVIL

[75] Inventor: Alistair K. Bodycomb, Baie D'Urfe, Quebec, Canada

[73] Assignee: Domtar Limited, Montreal, Canada

[22] Filed: Nov. 30, 1970

[21] Appl. No.: 93,793

[52] U.S. Cl. ............... 93/59 MT, 93/77 CL, 93/58.4, 93/80
[51] Int. Cl. .......... B31b 1/28, B31c 1/00, B31b 1/14
[58] Field of Search .......................... 93/58.4, 59, 80, 93/77 CL, 94 R

[56] References Cited

UNITED STATES PATENTS

| | | | |
|---|---|---|---|
| 2,575,631 | 11/1951 | Link | 93/59 ES |
| 3,507,022 | 4/1970 | Conru | 93/77 CL |
| 2,555,976 | 1/1971 | Carter | 93/59 MT |
| 3,574,034 | 4/1971 | Harvey | 93/80 X |
| 3,585,908 | 6/1971 | Snyderman | 93/58.4 X |
| 3,495,506 | 2/1970 | Plymale | 93/36 MM |

*Primary Examiner*—Andrew R. Juhasz
*Assistant Examiner*—Leon Gilden
*Attorney*—Cecil A. Rowley

[57] ABSTRACT

The invention provides a new cutter anvil attached to a winding mandrel for the making of spirally wound tubes. The tubes wound on the mandrel are transferred onto the cutter anvil to be cut to size. The anvil contains apertures openings outwardly and arranged in a ring about its leading end, and air under pressure is blown through these apertures to support the tube placed on the anvil for cutting.

3 Claims, 2 Drawing Figures

Patented May 1, 1973 3,730,061

INVENTOR
Alistair K. BODYCOMB

PATENT AGENT

AIR BEARING ANVIL

The present invention relates to the manufacture of tubes, more specifically to the manufacture of spirally wound composite tubes and to an apparatus to facilitate cutting of said tubes into discrete lengths.

In the manufacture of containers from spirally wound tubes, the tubes are first wound on a conventional mandrel and are continuously transferred onto a reciprocating cutter anvil where they are cut to length. The tubes or logs, as they are called, must slide onto the anvil and after a sufficient length of tubing has been slid thereon a plurality of cutters, usually rotating disc knives cooperate with the anvil, and while travelling with the anvil and log, sever the log into discrete lengths. Sometimes the tube is not properly centered on the anvil, or it fits too snugly thereon thereby rendering it difficult to properly slide the tube or log therealong.

Recently it has been proposed to extrude a sealant, such as hot melt, directly into the helical joint formed in the spiral winding operation thereby to seal this joint. It has been found that the sealant is not always completely set when it reaches the cutter anvil and problems have been encountered with the sealant sticking to the cutter anvil and preventing the log from sliding along the anvil and, in some cases, damaging the tubes.

It is thus the object of the present invention to provide an improved cutter anvil to facilitate moving of a log therealong.

Broadly, the present invention comprises a cutter anvil, a plurality of apertures adjacent the leading end of said anvil, means connecting said apertures to a source of air under pressure whereby air is blown out through said apertures into a tube on the anvil to support and facilitate moving of said tube along the anvil.

Further features, objects and advantages will be evident from the following detailed description taken in conjunction with the accompanying drawings in which.

Figures 1, 2:
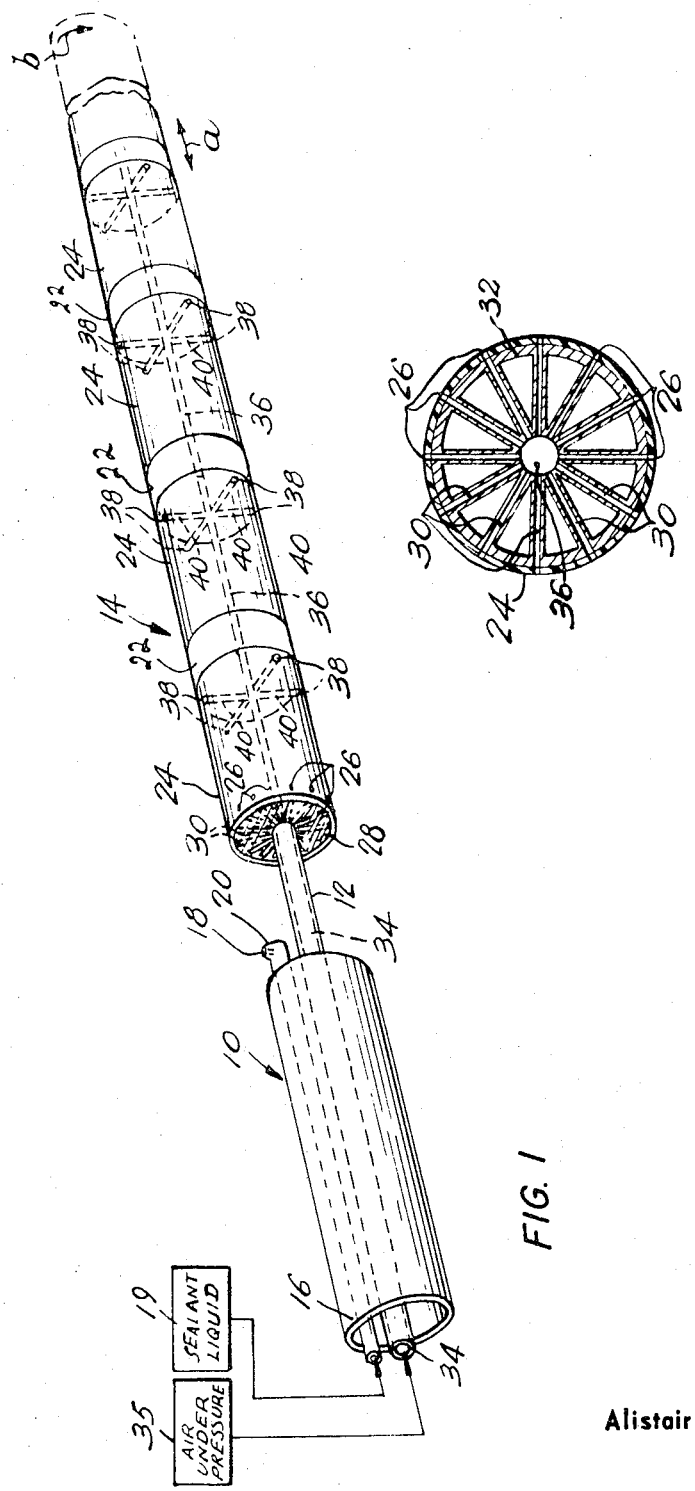
FIG. 1 is a partial schematic isometric view illustrating the cutter anvil of the present invention in position on the end of a conventional forming mandrel.
FIG. 2 is a section view of the anvil illustrating the connection of the orifices to the central air passage.

In the schematic illustration of FIG. 1, 10 designates a winding mandrel for winding of spiral wound containers. A first tube or pipe 12 passes through the mandrel 10 and supports a cutter anvil 14 in conventional manner. Also projecting through the mandrel 10 is a second tube or pipe 16 which connects an extrusion orifice 20 in block 18 slideably mounted on mandrel 10 to a source of sealant 19. Sealant from the source 19 passes through the tube 16 and orifice 18 and is extruded into the helical joint formed in the winding of the composite container in the manner described in Canadian Pat. No. 847,846.

The present invention is primarily concerned with the cutter anvil 14 which is constructed in a specific manner. The anvil has annular cutter rings 22 spaced with sleeves 24 therebetween mounted on a cylindrical pipe or core 32 (see FIG. 2). Preferably the sleeves 24 are formed from a slippery material such as polytetrafluoroethylene to facilitate travel of the log or tube along the anvil. These alternating sleeves and rings may be slid over the anvil and held in position by any suitable means such as by clamping same from the ends of the anvil. A plurality of small orifices 26 are arranged in a ring adjacent the leading end 28 of the leading sleeve 24 on the anvil 14. These orifices 26 are connected via suitable passages 30 to passage 34 in the tube 12 and to a source of air under pressure as indicated at 35. The passage 34 preferably projects longitudinally of the anvil 14 as indicated at 36 and has a plurality of auxiliary orifices 38 connected thereto by passages 40. The auxiliary orifices 38 are arranged in sets, each set forming an auxiliary ring of orifices immediately preceding each cutter ring 22. Generally there will be fewer orifices per auxiliary ring than there are orifices 26 for the leading ring on the mandrel.

In operation, a tube or log is formed by spirally winding in the conventional manner on the mandrel 10 and preferably by extruding hot melt or the like from the orifice 20 into the inner butt joint of the tube to seal same. The tubes so formed then pass on to the cutter anvil 14 which is reciprocated and rotated in the conventional manner, as indicated by the dotted line position and by the arrows $a$ and $b$, by drive means connected to tube 12 and compressed air from the source 35 is passed through passage 34, bore 36, passages 30 and orifices 26 into the inside of the formed tube. Some of this air travels between the tube and anvil 14 and exhausts at the trailing end of the anvil and the remainder escapes through the mandrel 10. This exhausting air forms an air layer between the anvil 14 and the formed tube, which layer supports the formed tube and facilitates movement of same along the anvil 14. The air travelling forwardly and escaping through the mandrel 10 cools the hot melt extruded from orifice 20 and thus tends to more quickly solidify same thereby alleviating the tendency for the hot melt to stick to the anvil 14.

If desired, the auxiliary orifices 38 may also be supplied with air through passages 34, 36 and 40 to aid in supporting and to facilitate movement of the tube along anvil 14.

Thus applicant has disclosed one form of the present invention; modifications will be evident to those skilled in the art without departing from the spirit of the invention as defined in the appended claims.

I claim:

1. A spiral winder comprising a winding mandrel, means for applying a sealant to the inner surface of a tube wound on said winding mandrel, a cutter anvil, supporting means extending between said winding mandrel and said cutter anvil to support said cutter anvil, a plurality of outwardly opening orifices arranged about said cutter anvil adjacent the end of said cutter anvil nearest said mandrel, a central passage in said anvil, means connecting said orifices with said passage, a source of compressed air, conduit means extending through said supporting means and connecting said passage and thereby said orifices to said source of compressed air, whereby air from said source is injected into said tube as said tube approaches said anvil and between said tube and said anvil whereby said air aids in setting said sealant and supports said tube on said anvil to facilitate relative sliding movement between said tube and said anvil.

2. An apparatus as defined in claim 1 wherein said anvil member includes a plurality of cutter rings spaced by spacing sleeves and arranged to form the periphery of said anvil, auxiliary orifices opening radially through the periphery of said anvil and arranged in rings immediately preceding each of said cutter rings, air passages connecting said auxiliary orifices to said central passage.

3. An apparatus as defined in claim 2 wherein said sleeves have their exposed peripheral surfaces composed of polytetrafluoroethylene.

* * * * *